United States Patent
Kim

(10) Patent No.: US 9,199,530 B2
(45) Date of Patent: Dec. 1, 2015

(54) POWER TRANSMISSION APPARATUS FOR VEHICLE

(71) Applicant: Hyundai Motor Company, Seoul (KR)

(72) Inventor: Wan Soo Kim, Whasung-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 25 days.

(21) Appl. No.: 14/141,247

(22) Filed: Dec. 26, 2013

(65) Prior Publication Data

US 2015/0105204 A1   Apr. 16, 2015

(30) Foreign Application Priority Data

Oct. 14, 2013  (KR) .................. 10-2013-0122236

(51) Int. Cl.
*B60K 6/547* (2007.10)
*F16H 37/04* (2006.01)
*B60K 6/48* (2007.10)

(52) U.S. Cl.
CPC .............. *B60K 6/547* (2013.01); *F16H 37/046* (2013.01); *B60K 2006/4816* (2013.01); *Y10S 903/902* (2013.01)

(58) Field of Classification Search
CPC . F16H 37/042; F16H 37/0806; F16H 37/082; F16H 37/0833; F16H 2037/048; B60K 6/365; B60K 3/547; B60K 17/06; B60K 24/00
See application file for complete search history.

(56) References Cited

U.S. PATENT DOCUMENTS

| | | | |
|---|---|---|---|
| 2005/0204837 A1* | 9/2005 | Janson et al. | 74/325 |
| 2008/0227592 A1 | 9/2008 | Steffen et al. | |
| 2009/0203484 A1* | 8/2009 | Earhart | 475/207 |
| 2010/0009805 A1* | 1/2010 | Bachmann | 477/5 |
| 2010/0173746 A1* | 7/2010 | Ideshio et al. | 477/36 |

FOREIGN PATENT DOCUMENTS

| | | |
|---|---|---|
| JP | 2001-352604 A | 12/2001 |
| JP | 4566199 B2 | 11/2007 |

* cited by examiner

*Primary Examiner* — Huan Le
(74) *Attorney, Agent, or Firm* — Morgan, Lewis & Bockius LLP

(57) ABSTRACT

A power transmission apparatus for a vehicle includes: a first clutch and a second clutch, a first input shaft receiving rotary power of the engine through the first clutch and having a plurality of input gears, a second input shaft receiving rotary power of the engine through the second clutch, a planetary gear set having first rotary element connected with the second input shaft, second rotary element connected with the first input shaft, and third rotary element being directly connected with a transmission housing, a first transmission outputting mechanism to output the rotary power transferred from the first input shaft and a second transmission outputting mechanism to output the rotary power transferred from the first input shaft, a motor/generator transferring the rotary power to the first and second transmission outputting mechanisms, and a final deceleration mechanism finally decelerating the rotary power transferred from the transmission outputting device.

14 Claims, 3 Drawing Sheets

FIG. 2

| DRIVING MODE | CL1 | CL2 | |
|---|---|---|---|
| EV MODE | | | START, LOW-SPEED START |
| HEV FUEL EFFICIENCY MODE | ● | | MEDIUM/HIGH SPEED, FUEL EFFICIENCY MODE TRAVELLING |
| HEV POWER PERFORMANCE MODE | | ● | LOW/MEDIUM SPEED, POWER PERFORMANCE TRAVELLING |

POWER TRANSMISSION APPARATUS FOR VEHICLE

CROSS-REFERENCE TO RELATED APPLICATION

The present application claims priority to Korean Patent Application No. 10-2013-0122236 filed on Oct. 14, 2013, the entire contents of which is incorporated herein for all purposes by this reference.

BACKGROUND OF THE INVENTION

1. Field of the Invention

The present invention relates to a power transmission apparatus for a vehicle that can implement smooth start and transmission by adding an electric supplementary drive unit and torque converting device to a double clutch transmission device, and improve fuel efficiency and acceleration performance.

2. Description of Related Art

Environment-friendly technology in a vehicle is core technology for survival of a future automobile industry and automakers devote all their energy to developing an environment-friendly automobile for getting over environmental and fuel efficiency regulations.

Examples of future automobile technologies may include an electric vehicle (EV) using electric energy, a hybrid electric vehicle (HEV), and a double clutch transmission (DCT) of which efficiency and convenience are improved.

Further, the automakers have made efforts to commercialize technologies such as an idle stop and go (ISG) device and a regenerative braking system as means for meeting an exhaust gas regulation of each nation and improving efficiency of a power transmission system for improving fuel efficiency performance.

The ISG device is technology that stops an engine when the vehicle stops and starts the engine when the vehicle starts, and the regenerative braking system is technology that drives a generator by using kinetic energy of the vehicle instead of existing braking by friction when the vehicle is braked and stores the resulting electric energy in a battery and reuses the stored electric energy when the vehicle is driven.

In addition, the hybrid electric vehicle which can adopt the transmission apparatus of the present invention as an automobile using two or more power sources may have various types of combinations, and in general, a hybrid of a gasoline engine or a diesel engine using existing fossil fuel and a motor/generator driven by the electric energy is provided.

As a transmission which can be adopted by the hybrid electric vehicle, the double clutch transmission (DCT) may be used as one example and the DCT applies two clutches to a manual transmission structure to increase efficiency and improve convenience.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a power transmission apparatus for a vehicle that can implement smooth start and transmission by adding an electric supplementary drive unit and torque converting device to a double clutch transmission device, and improve fuel efficiency and acceleration performance.

An exemplary embodiment of the present invention provides a power transmission apparatus for a vehicle, including power control device including a first clutch and a second clutch to control rotary power of an engine, input device including a first input shaft receiving the rotary power of the engine through the first clutch and having a plurality of input gears which are integrally formed and a second input shaft disposed on an outer periphery of the first input shaft without rotary interference to receive the rotary power of the engine through the second clutch, torque converting device formed by a planetary gear set having first, second, and third rotary elements, the first rotary element being connected with the second input shaft, the second rotary element being connected with the first input shaft, and the third rotary element being directly connected with a transmission housing to serve as a fixing element, transmission outputting device including a first transmission outputting mechanism disposed in parallel to the first input shaft to transmit and output the rotary power transferred from the first input shaft to a plurality of advance transmission ratios and a second transmission outputting mechanism disposed in parallel to the first input shaft to transmit and output the rotary power transferred from the first input shaft to a plurality of advance transmission ratios, an electric supplementary drive unit including a motor/generator performing both motor and generator functions transferring the rotary power to the first and second transmission outputting mechanisms, and a final deceleration mechanism finally decelerating the rotary power transferred from the transmission outputting device through a differential.

The torque converting device may be configured by a single pinion planetary gear set having a first rotary element formed by a sun gear, a second rotary element formed by a planetary carrier, and a third rotary element formed by a ring gear.

The torque converting device may be configured by a double pinion planetary gear set having a first rotary element formed by the sun gear, a second rotary element formed by the ring gear, and a third rotary element formed by the planetary carrier.

The transmission outputting device may include a first transmission outputting mechanism including a first output shaft disposed in parallel to the first input shaft with a predetermined gap, first and second-drive transmission gears disposed on the first output shaft, a first synchronizer which is a synchronization unit that selectively synchronization-connects the first or second-drive transmission gear to the first output shaft, and a first output gear integrally formed at one side of the first output shaft, and a second transmission outputting mechanism including a second output shaft disposed in parallel to the first input shaft with a predetermined gap, third and fourth-drive transmission gears disposed on the second output shaft, a second synchronizer which is a synchronization unit that selectively synchronization-connects the third or fourth-drive transmission gear to the second output shaft, and a second output gear integrally formed at one side of the second output shaft.

The plurality of input gears may include a first input gear connected with the first-drive transmission gear and the third-drive transmission gear through an external gear, and a second input gear connected with the second-drive transmission gear and the fourth-drive transmission gear through the external gear.

The electric supplementary drive unit may include a motor/generator performing both the motor and generator functions, a motor drive gear disposed on the first input shaft without rotary interference and directly connected with the motor/generator, and first and second motor driven gears formed integrally with the first and second output shafts and each connected with the motor drive gear through the external gear.

According to exemplary embodiments of the present invention, start and transmission is performed by using a motor/generator as an electric supplementary drive unit and a planetary gear set as torque converting device to implement smooth start and transmission.

Further, a no-load gear noise problem and a drag loss of an idle gear which structurally occur in an existing manual transmission can be solved.

In addition, the planetary gear set used as the torque converting device can distribute input torque to improve power transmission efficiency and durability, and the planetary gear set has high rigidity to remove gear whining noise as compared with an external gear.

When auxiliary power is input by the motor/generator, torque is increased in the planetary gear set to transmit power and the motor/generator has higher rpm than an engine to be used in a high-speed area where an efficiency point is high.

Since four-speed transmission is achieved in an EV mode, the motor can efficiently be used and a capacity of the motor/generator can be reduced.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operating element table of the power transmission apparatus for a vehicle according to the various exemplary embodiments.

Figure 1:
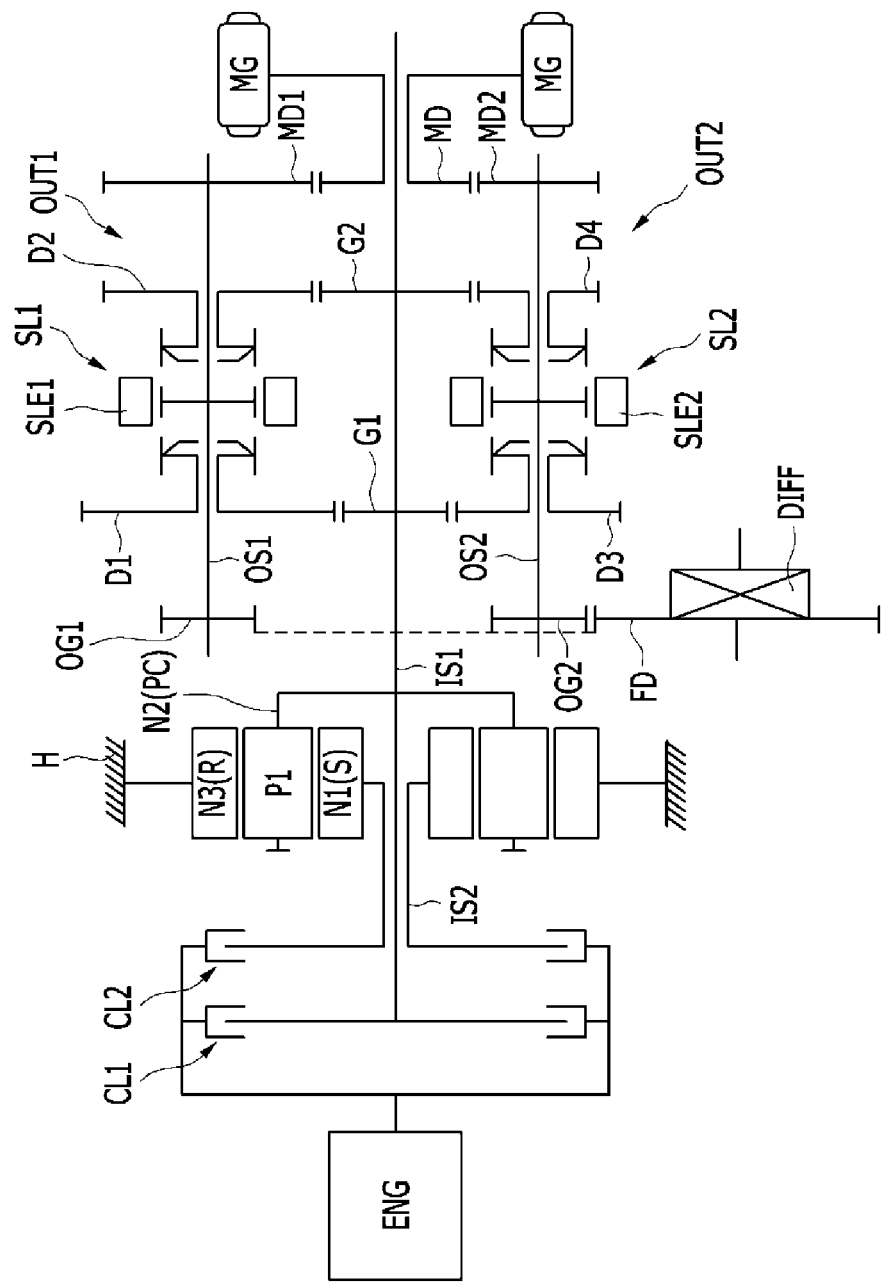
FIG. 1 is a configuration diagram of a power transmission apparatus for a vehicle according to various exemplary embodiments of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, exemplary embodiments of the present invention will be described in detail with reference to the accompanying drawings.

Accordingly, the drawings and description are to be regarded as illustrative in nature and not restrictive. Like reference numerals designate like elements throughout the specification.

Names of elements in the following description are distinguished into first, second, and the like in order to distinguish the elements because the names of the elements are the same and are not particularly limited to an order thereof.

FIG. 1 is a configuration diagram of a power transmission apparatus for a vehicle according to a first exemplary embodiment of the present invention.

Referring to FIG. 1, the power transmission apparatus for a vehicle according to the first exemplary embodiment of the present invention includes power control means, input device, torque converting device, transmission outputting means, an electric supplementary drive unit, and a final deceleration mechanism.

The power control device includes a first clutch CL1 and a second clutch CL2, and the first clutch CL1 and the second clutch CL2 may be formed by a known fluid multiple clutch and activation and deactivation of the first and second clutches CL1 and CL2 may be controlled by a hydraulic control system, and the first and second clutches CL1 and CL2 may be formed by a dry multiplate clutch.

The input device includes a first input shaft IS1 and a second input shaft IS2.

The first input shaft IS1 is formed by a solid shaft and the second input shaft IS2 is formed by a hollow shaft.

The first input shaft IS1 is disposed by penetrating a hollow of the second input shaft IS2 without rotary interference and is connected with an engine ENG through the first clutch CL1 to selectively receive rotary power of the engine ENG.

A first input gear G1 and a second input gear G2 are integrally formed at a rear side of the first input shaft IS1 with a predetermined gap from each other.

The second input shaft IS2 is connected with the engine ENG through the second clutch CL2 to selectively receive the rotary power of the engine ENG.

The torque converting device is formed by a planetary gear set PG, and in the first exemplary embodiment of the present invention, a single pinion planetary gear set having three rotary elements is adopted.

Three rotary elements include a first rotary element N1 formed by a sun gear S, a second rotary element N2 formed by a planetary carrier PC, and a third rotary element N3 formed by a ring gear R.

The first rotary element N1 is connected with the engine ENG through the second clutch CL2 to selectively receive the rotary power of the engine.

The second rotary element N2 is directly connected with the first input shaft IS1 to selectively receive the rotary power of the engine ENG through the first clutch CL1 or decelerates the rotary power input into the second input shaft IS2 to transfer the decelerated rotary power to the first input shaft IS1.

The third rotary element N3 is directly connected with a housing H to continuously operate as a fixing element.

The transmission outputting device includes first and second transmission outputting mechanisms OUT1 and OUT2 that are disposed in parallel to the first and second input shafts IS1 and IS2 with a predetermined gap.

The first transmission outputting mechanism OUT1 includes a first output shaft OS1 disposed in parallel to the first input shaft IS1 with a predetermined gap, first and second-drive transmission gears D1 and D2 disposed on the first output shaft OS1, a first synchronizer SL1 which is a synchronization unit that selectively synchronization-connects the first or second-drive transmission gears D1 or D2 to the first output shaft OS1, and a first output gear OG1 integrally formed at a front side of the first output shaft OS1.

The first-drive transmission gear D1 is externally engaged with a first input gear G1 and a second-drive transmission gear D2 is externally engaged with the second input gear G2.

In addition, the rotary power transmitted through the first transmission outputting mechanism OUT1 is transferred to the final deceleration gear FD through the first output gear OG1 of the first output shaft OS1 and the rotary power transferred through the final deceleration gear FD is transferred through a differential DIFF.

The second transmission outputting mechanism OUT2 includes a second output shaft OS2 disposed in parallel to the first input shaft IS1 with a predetermined gap, third and fourth-drive transmission gears D3 and D4 disposed on the second output shaft OS2, a second synchronizer SL2 which is a synchronization unit that selectively synchronization-connects the third or fourth-drive transmission gears D3 or D4 to the second output shaft OS2, and a second output gear OG2 integrally formed at a front side of the second output shaft OS2.

The third-drive transmission gear D3 is externally engaged with the first input gear G1 and the fourth-drive transmission gear D4 is externally engaged with the second input gear G2.

In addition, the rotary power transmitted through the second transmission outputting mechanism OUT2 is transferred to the final deceleration gear FD through the first output gear OG1 of the second output shaft OS2 and the rotary power transferred through the final deceleration gear FD is transferred to the driving wheel through the differential DIFF.

Since the first and second synchronizers SL1 and SL2 are known components, a detailed description thereof will be omitted and respective sleeves SLE1 and SLE2 applied to the first and second synchronizers SL1 and SL2 have an additional actuator as known and the actuator is controlled by a transmission control unit.

The electric supplementary drive unit is formed by a motor/generator MG that simultaneously performs motor and generator functions as applied to a general electric vehicle.

The motor/generator MG is constituted by a rotor and a stator, and the rotor is directly connected with a motor drive gear MD disposed on the second input shaft IS2 without rotary interference and the stator is fixed to the housing H.

Further, the motor drive gear MD is connected with first and second motor driven gears MD1 and MD2 that are formed integrally with the first and second output shafts OS1 and OS2 through an external gear.

As a result, when the motor/generator MG is driven, the rotary power is transferred to the first and second output shafts OS1 and OS2 through the motor drive gear MD and the first and second motor driven gears MD1 and MD2.

The final deceleration mechanism is formed by the final deceleration gear FD including the differential DIFF as known.

FIG. 2 is an operating element table of the power transmission apparatus for a vehicle according to the first exemplary embodiment of the present invention.

Referring to FIG. 2, in an EV mode, both the first and second clutches CL1 and CL2 are not activated, in an HEV fuel efficiency mode, the first clutch CL1 is activated, and in an HEV power performance mode, the second clutch CL2 is activated, and each of the sleeves SLE1 and SLE2 of the first and second synchronizers SL1 and SL2 is selectively synchronization-engaged with a transmission gear of a corresponding transmission stage to achieve transmission.

[EV Mode]

In the EV mode, both the first and second clutches CL1 and CL2 are not activated and travelling is performed by driving force of the motor/generator MG.

That is, the driving force of the motor/generator MG is transferred to the first and second output shafts OS1 and OS2 through the motor drive gear MD and the first and second motor driven gears MD1 and MD2.

The rotary power transferred to the first and second output shafts OS1 and OS2 is transmitted to a transmission stage which is appropriate to travelling in the transmission outputting device to be transferred to the final deceleration gear FD through the first output gear OG1 or the second output gear OG2, and the rotary power transferred through the final deceleration gear FD is transferred to the driving wheel through the differential DIFF.

As described above, the power transmission apparatus for a vehicle according to the first exemplary embodiment of the present invention may be transmitted to four-speed transmission stages in the EV mode, and as a result, low-speed start and smooth start are achieved.

[HEV Fuel Efficiency Mode]

In the HEV fuel efficiency mode, activation of the first clutch CL1 is controlled.

Then, the rotary power from the engine ENG is transferred to the first input shaft IS1 to become (in) a direct-connection state and the rotary power transferred to the first input shaft IS1 is transmitted to a transmission stage which is appropriate to travelling in the transmission outputting device to be transferred to the final deceleration gear FD through the first output gear OG1 or the second output gear OG2, and the rotary power transferred through the final deceleration gear FD is transferred to the driving wheel through the differential DIFF.

Accordingly, driving in a medium/high-speed area is enabled and in this case, when supplementary power is supported from the motor/generator MG, torque increases, and as a result, fuel efficiency may be improved while the driving in the high-speed area in which the efficiency point is high is enabled.

In such a transmission process, an output speed is sensed and a gear to be transmitted and a speed of an output shaft are synchronized through the motor/generator MG and thereafter, transmission is achieved.

[HEV Power Performance Mode]

In the HEV power performance mode, activation of the second clutch CL2 is controlled.

Then, the rotary power from the engine ENG is transferred to the second input shaft IS2 and deceleration is thus decelerated in the torque converting device and thereafter, transferred to the first input shaft IS1, the rotary power transferred to the first input shaft IS1 is transmitted to a transmission stage which is appropriate to travelling in the transmission outputting device to be transferred to the final deceleration gear FD through the first output gear OG1 or the second output gear OG2, and the rotary power transferred through the final deceleration gear FD is transferred to the driving wheel through the differential DIFF.

Accordingly, power performance driving in a low/medium-speed area is enabled and in this case, when supplementary power is supported from the motor/generator MG, torque increases, and as a result, high-efficiency-point driving is enabled.

In such a transmission process, the output speed is sensed and the gear to be transmitted and the speed of the output shaft are synchronized through the motor/generator MG and thereafter, the transmission is achieved.

According to the first exemplary embodiment of the present invention as described above, start and transmission is performed by using a motor/generator as an auxiliary electric driving unit and a planetary gear set as torque converting device to implement smooth start and transmission.

Further, a no-load gear noise problem and a drag loss of an idle gear which structurally occur in an existing manual transmission can be solved.

In addition, the planetary gear set used as the torque converting device distributes input torque to improve power transmission efficiency and durability, and the planetary gear set has high rigidity to remove gear whining noise as compared with an external gear.

When auxiliary power is input by the motor/generator, torque is increased in the planetary gear set to transmit power and the motor/generator has higher rpm than an engine to be used in a high-speed area where an efficiency point of the motor is high.

Since four-speed transmission is achieved in an EV mode, the efficiency point of the motor can be used and a capacity of the motor/generator can be reduced.

Figure 3:
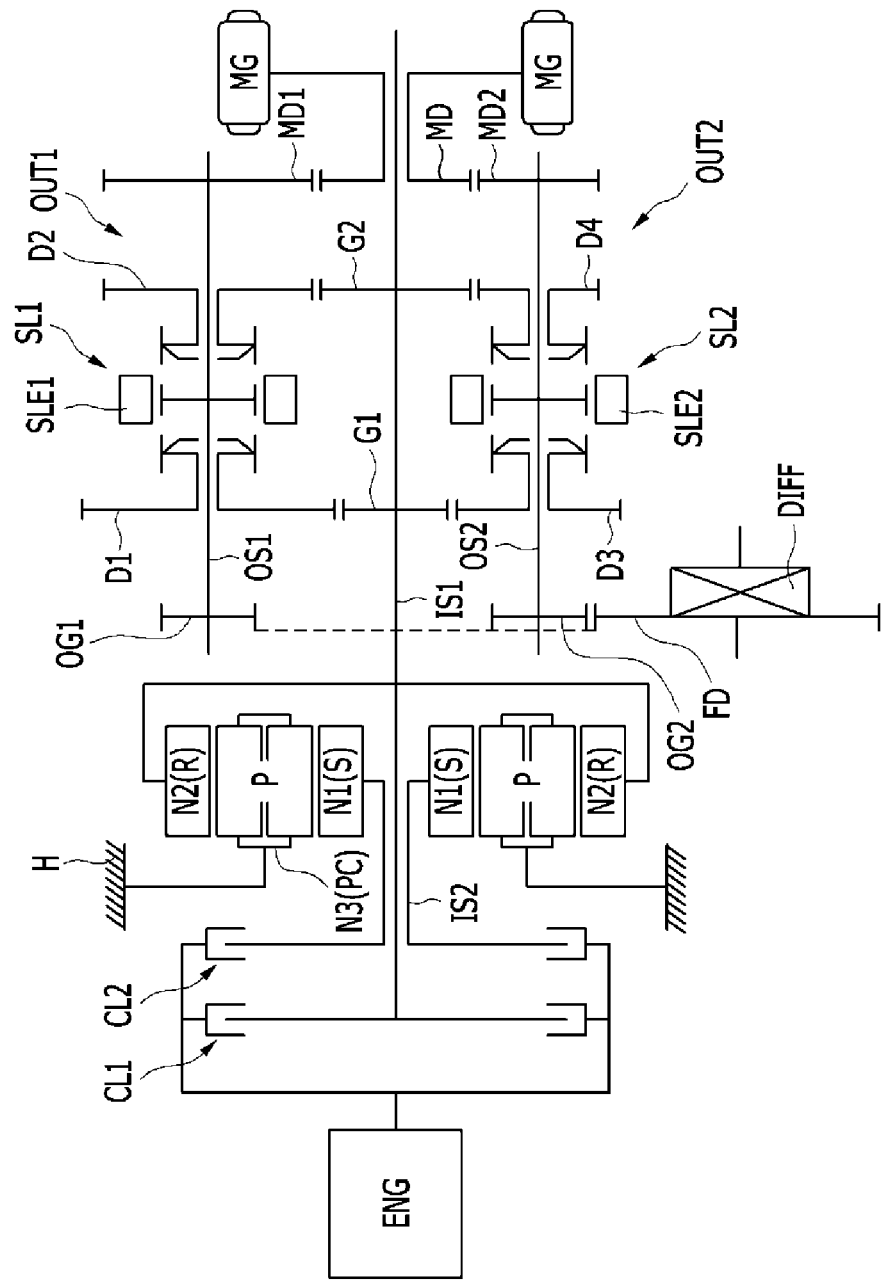
FIG. 3 is a configuration diagram of a power transmission apparatus for a vehicle according to various exemplary embodiments.

FIG. 3 is a configuration diagram of a power transmission apparatus for a vehicle according to a second exemplary embodiment of the present invention.

Referring to FIG. 3, in the power transmission apparatus for a vehicle according to the second exemplary embodiment of the present invention, a double pinion planetary gear set is adopted as the torque converting device.

As a result, the first rotary element N1, the second rotary element N2, and the third rotary element N3 of the first torque converting device are formed by the sun gear, the ring gear R, and the planetary carrier, respectively.

Therefore, as compared with the first exemplary embodiment, only constituent members of the second and third rotary elements N2 and N3 are changed and an operating effect is not changed, and as a result, a detailed description thereof will be omitted.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. They are not intended to be exhaustive or to limit the invention to the precise forms disclosed, and obviously many modifications and variations are possible in light of the above teachings as well as various alternatives and modifications thereof. It is intended that the scope of the invention be defined by the Claims appended hereto and their equivalents.

What is claimed is:

1. A power transmission apparatus for a vehicle, comprising:
    a power control device including a first clutch and a second clutch to control rotary power of an engine;
    an input device including:
        a first input shaft selectively receiving the rotary power of the engine through the first clutch and having a plurality of input gears which are integrally formed to the first input shaft; and
        a second input shaft disposed on an outer periphery of the first input shaft without rotary interference to selectively receive the rotary power of the engine through the second clutch;
    a torque converting device formed by a planetary gear set having first, second, and third rotary elements, the first rotary element being connected with the second input shaft, the second rotary element being connected with the first input shaft, and the third rotary element being directly connected with a transmission housing to serve as a fixing element;
    a transmission outputting device including:
        a first transmission outputting mechanism disposed in parallel to the first input shaft to transmit and output the rotary power transferred from the first input shaft to a plurality of advance transmission ratios; and
        a second transmission outputting mechanism disposed in parallel to the first input shaft to transmit and output the rotary power transferred from the first input shaft to a plurality of additional advance transmission ratios;
    an electric supplementary drive unit including a motor/generator performing both motor and generator functions transferring rotary power thereof to the first and second transmission outputting mechanisms; and
    a final deceleration mechanism finally decelerating the rotary power transferred from the transmission outputting device and transferring the rotary power through a differential.

2. The apparatus of claim 1, wherein the torque converting device is configured by a single pinion planetary gear set having the first rotary element formed by a sun gear, the second rotary element formed by a planetary carrier, and the third rotary element formed by a ring gear.

3. The apparatus of claim 1, wherein the torque converting device is configured by a double pinion planetary gear set having the first rotary element formed by a sun gear, the second rotary element formed by a ring gear, and the third rotary element formed by a planetary carrier.

4. The apparatus of claim 1, wherein the electric supplementary drive unit includes:
    the motor/generator performing both the motor and generator functions;
    a motor drive gear disposed on the first input shaft without rotary interference and directly connected with the motor/generator; and
    first and second motor driven gears respectively fixed to the first and second output shafts and each externally engaged with the motor drive gear.

5. The apparatus of claim 1, wherein the transmission outputting device includes:
    the first transmission outputting mechanism having:
        a first output shaft disposed in parallel to the first input shaft with a predetermined gap;
        first and second-drive transmission gears disposed on the first output shaft;

a first synchronizer which is a synchronization unit that selectively synchronization-connects the first or second-drive transmission gears to the first output shaft; and a first output gear integrally formed at one side of the first output shaft; and the second transmission outputting mechanism having:

a second output shaft disposed in parallel to the first input shaft with a predetermined gap;

third and fourth-drive transmission gears disposed on the second output shaft;

a second synchronizer which is a synchronization unit that selectively synchronization-connects the third or fourth-drive transmission gears to the second output shaft; and a second output gear integrally formed at one side of the second output shaft.

6. The apparatus of claim 5, wherein the plurality of input gears includes:

a first input gear externally engaged with the first-drive transmission gear and the third-drive transmission gear; and a second input gear externally engaged with the second-drive transmission gear and the fourth-drive transmission gear through the external gear.

7. A power transmission apparatus for a vehicle, comprising:

a power control device including a first clutch and a second clutch to control rotary power of an engine;

an input device including:

a first input shaft receiving the rotary power of the engine through the first clutch and having a plurality of input gears which are integrally formed; and a second input shaft disposed on an outer periphery of the first input shaft without rotary interference to receive the rotary power of the engine through the second clutch;

a torque converting device including a single pinion planetary gear set in which a sun gear is connected with the second input shaft, a planetary carrier is connected with the first input shaft, and a ring gear is directly connected to a transmission housing to serve as a fixing element;

a transmission outputting device including:

a first transmission outputting mechanism disposed in parallel to the first input shaft to transmit and output the rotary power transferred from the first input shaft to a plurality of advance transmission ratios; and a second transmission outputting mechanism disposed in parallel to the first input shaft to transmit and output the rotary power transferred from the first input shaft to a plurality of additional advance transmission ratios;

an electric supplementary drive unit including a motor/generator performing both motor and generator functions transferring rotary power thereof to the first and second transmission outputting mechanisms; and a final deceleration mechanism finally decelerating the rotary power transferred from the transmission outputting device and transferring the rotary power through a differential.

8. The apparatus of claim 7, wherein the electric supplementary drive unit includes:

the motor/generator performing both the motor and generator functions;

a motor drive gear disposed on the first input shaft without rotary interference and directly connected with the motor/generator; and first and second motor driven gears respectively fixed to the first and second output shafts and each externally engaged with the motor drive gear.

9. The apparatus of claim 7, wherein the first transmission outputting mechanism includes:

a first output shaft disposed in parallel to the first input shaft with a predetermined gap;

first and second-drive transmission gears disposed on the first output shaft;

a first synchronizer which is a synchronization unit that selectively synchronization-connects the first or second-drive transmission gear to the first output shaft, and a first output gear integrally formed at one side of the first output shaft; and wherein the second transmission outputting mechanism includes:

a second output shaft disposed in parallel to the first input shaft with a predetermined gap;

third and fourth-drive transmission gears disposed on the second output shaft;

a second synchronizer which is a synchronization unit that selectively synchronization-connects the third or fourth-drive transmission gear to the second output shaft; and a second output gear integrally formed at one side of the second output shaft.

10. The apparatus of claim 9, wherein the plurality of input gears includes:

a first input gear externally engaged with the first-drive transmission gear and the third-drive transmission gear; and a second input gear externally engaged with the second-drive transmission gear and the fourth-drive transmission gear.

11. A power transmission apparatus for a vehicle, comprising:

a power control device including a first clutch and a second clutch to control rotary power of an engine;

an input device including:

a first input shaft receiving the rotary power of the engine through the first clutch and having a plurality of input gears which are integrally formed; and a second input shaft disposed on an outer periphery of the first input shaft without rotary interference to receive the rotary power of the engine through the second clutch;

a torque converting device including a double pinion planetary gear set in which a sun gear is connected with the second input shaft, a ring gear is connected with the first input shaft, and a planetary carrier is directly connected to a transmission housing to serve as a fixing element;

a transmission outputting device including:

a first transmission outputting mechanism disposed in parallel to the first input shaft to transmit and output the rotary power transferred from the first input shaft to a plurality of advance transmission ratios; and a second transmission outputting mechanism disposed in parallel to the first input shaft to transmit and output the rotary power transferred from the first input shaft to a plurality of additional advance transmission ratios;

an electric supplementary drive unit including a motor/generator performing both motor and generator functions transferring rotary power thereof to the first and second transmission outputting mechanisms; and a final deceleration mechanism finally decelerating the rotary power transferred from the transmission outputting device and transferring the rotary power through a differential.

12. The apparatus of claim 11, wherein the electric supplementary drive unit includes:
   the motor/generator performing both the motor and generator functions;
   a motor drive gear disposed on the first input shaft without rotary interference and directly connected with the motor/generator; and
   first and second motor driven gears respectively fixed to the first and second output shafts and each externally engaged with the motor drive gear.

13. The apparatus of claim 11,
   wherein the first transmission outputting mechanism includes:
      a first output shaft disposed in parallel to the first input shaft with a predetermined gap;
      first and second-drive transmission gears disposed on the first output shaft;
      a first synchronizer which is a synchronization unit that selectively synchronization-connects the first or second-drive transmission gear to the first output shaft, and
      a first output gear integrally formed at one side of the first output shaft; and
   wherein the second transmission outputting mechanism including:
      a second output shaft disposed in parallel to the first input shaft with a predetermined gap;
      third and fourth-drive transmission gears disposed on the second output shaft;
      a second synchronizer which is a synchronization unit that selectively synchronization-connects the third or fourth-drive transmission gear to the second output shaft; and
      a second output gear integrally formed at one side of the second output shaft.

14. The apparatus of claim 13, wherein the plurality of input gears includes:
   a first input gear externally engaged with the first-drive transmission gear and the third-drive transmission gear; and
   a second input gear externally engaged with the second-drive transmission gear and the fourth-drive transmission gear.

* * * * *